United States Patent
Alexandrov et al.

(10) Patent No.: US 9,410,407 B2
(45) Date of Patent: *Aug. 9, 2016

(54) GAS EVOLVING OIL VISCOSITY DIMINISHING COMPOSITIONS FOR STIMULATING THE PRODUCTIVE LAYER OF AN OIL RESERVOIR

(71) Applicant: Viscos Energy Services AG, Cham (CH)

(72) Inventors: Eugeny Nikolaevich Alexandrov, Moscow (RU); Dmitry Anatoljevich Lemenovski, Moscow (RU); Zdenek Koller, Prague (CZ)

(73) Assignee: Viscos Energy Services AG, Cham (CH)

( * ) Notice: Subject to any disclaimer, the term of this patent is extended or adjusted under 35 U.S.C. 154(b) by 409 days.

This patent is subject to a terminal disclaimer.

(21) Appl. No.: 13/771,898

(22) Filed: Feb. 20, 2013

(65) Prior Publication Data

US 2013/0206413 A1 Aug. 15, 2013

Related U.S. Application Data

(63) Continuation of application No. 13/124,637, filed as application No. PCT/EP2008/008725 on Oct. 15, 2008, now Pat. No. 8,387,697.

(51) Int. Cl.
| | |
|---|---|
| *E21B 43/24* | (2006.01) |
| *C09K 8/92* | (2006.01) |
| *E21B 17/18* | (2006.01) |
| *E21B 36/00* | (2006.01) |
| *E21B 43/243* | (2006.01) |
| *C09K 8/58* | (2006.01) |

(52) U.S. Cl.
CPC . *E21B 43/24* (2013.01); *C09K 8/58* (2013.01); *C09K 8/92* (2013.01); *E21B 17/18* (2013.01); *E21B 36/008* (2013.01); *E21B 43/243* (2013.01)

(58) Field of Classification Search
None
See application file for complete search history.

(56) References Cited

U.S. PATENT DOCUMENTS

| | | | |
|---|---|---|---|
| 1,816,260 A | 7/1931 | Edward | |
| 3,126,961 A | 3/1964 | Craig, Jr. et al. | |
| 3,163,211 A | 12/1964 | Henley | |
| 3,485,686 A | 12/1969 | Jessop | |
| 4,685,836 A | 8/1987 | Burger et al. | |
| 4,988,389 A | 1/1991 | Adamache et al. | |
| 5,832,999 A | 11/1998 | Ellwood | |
| 6,488,086 B1 | 12/2002 | Daragan et al. | |
| 8,387,697 B2 * | 3/2013 | Alexandrov | C09K 8/92 166/302 |
| 2008/0217008 A1 | 9/2008 | Langdon et al. | |

FOREIGN PATENT DOCUMENTS

| | | |
|---|---|---|
| DE | 3543259 | 6/1986 |
| RU | 2100583 | 12/1997 |

(Continued)

*Primary Examiner* — Angela M DiTrani
(74) *Attorney, Agent, or Firm* — Pearl Cohen Zedek Latzer Baratz LLP

(57) ABSTRACT

Disclosed is a chemical system of gas evolving oil viscosity diminishing compositions (GEOVDC) for stimulating the productive layer of an oil reservoir, that is to chemical compositions for a thermochemical treatment of an oil reservoir, more specifically for initiating a chemical reaction in the productive layer zone of the oil reservoir to produce heat and evolve gases so that the extraction of oil (petroleum) is improved. Further disclosed is a method of thermochemically treating an oil reservoir by means of this chemical system, and an apparatus for performing thermochemical treatment of an oil reservoir.

18 Claims, 6 Drawing Sheets

(56) References Cited

FOREIGN PATENT DOCUMENTS

| RU | 2126084 | 2/1999 |
|---|---|---|
| RU | 2153065 | 8/1999 |
| RU | 2194156 | 12/2002 |
| WO | 02103152 | 12/2002 |
| WO | 2006063200 | 6/2006 |
| WO | 2008100176 | 8/2008 |

* cited by examiner

GAS EVOLVING OIL VISCOSITY DIMINISHING COMPOSITIONS FOR STIMULATING THE PRODUCTIVE LAYER OF AN OIL RESERVOIR

CROSS-REFERENCES

This application is a Continuation of U.S. patent application Ser. No. 13/124,637, filed Apr. 15, 2011, claiming priority under 35 U.S.C. 371 from International Patent Application No. PCT/EP2008/008725 filed Oct. 15, 2008, the entire contents of which are herein incorporated by reference.

BACKGROUND OF THE INVENTION

The invention is directed to a chemical system of gas evolving oil viscosity diminishing compositions (GEOVDC) for stimulating the productive layer of an oil reservoir, that is to chemical compositions for a thermochemical treatment of an oil reservoir, more specifically for initiating a chemical reaction in the productive layer zone of the oil reservoir to produce heat and evolve gases so that the extraction of oil (petroleum) is improved. The invention is further directed to a method of thermochemically treating an oil reservoir by means of this chemical system, and to an apparatus for performing thermochemical treatment of an oil reservoir.

The extraction of petroleum from an oil reservoir usually starts with recovery methods using underground pressure in the oil reservoir which will force the oil to the surface. Over the lifetime of the oil well the pressure decreases, and it becomes necessary to use other extraction methods such as using pumps or injecting water, natural gas or other gases into the oil well to bring the oil to the surface. After recovery methods are no longer effective the oil reservoir usually still contains considerable amounts of petroleum being enclosed in small cavities or pores of the rock or sand formations.

To recover the remaining amounts of petroleum tertiary oil recovery methods are used which mainly have the aim to reduce the viscosity of the petroleum. One common method is to inject hot steam into the oil well to heat the petroleum and thus to reduce its viscosity. This method, however, is efficient only up to a depth of about 1 km as otherwise the hot steam will be cooled down before reaching the pay zone. Further, with this method up to 3 to 5 months of injecting hot steam are necessary to heat up the pay zone. Alternatively, surfactants or solvents can be injected into the oil well to leach out the petroleum. Such methods however, have the disadvantages that the extracted petroleum will be contaminated by chemicals so that additional efforts and costs are necessary to recover the petroleum.

Another tertiary oil recovery method is characterized in that a chemical reaction is initiated in the pay zone of the oil reservoir to produce hot gases which heat up the oil in the pay zone to reduce its viscosity and to support oil recovery by increasing the pressure in the oil well.

Disclosed in Russian patent applications RU 2100583 C1, RU 2126084 C1 and RU 2153065 C1 are fuel and oxidizing compositions (FOC) which are able to produce hot gases after initiating a chemical reaction. FOC are intended to be introduced into the oil well of an oil reservoir for a thermochemical treatment of the pay zone. The chemical compositions are aqueous solutions containing large amounts of up to 60% by mass or more of ammonium nitrate, $NH_4NO_3$. The other components of FOC are for instance glycerin, nitric acid, carbamide, potassium permanganate, acetic acid, isopropyl metacarborane and acetylsalicylate. After injection of the FOC into the oil well it is ignited by initiating a fuse explosion. The decomposition of 1 kg of FOC results in emitting a quantity of heat of about 500-1000 kcal.

FOC contain an excess of oxygen and hence have a substantial oxidizing character, so that with the admixture of petroleum an explosive composition is created. Further, aqueous solutions containing large amounts of ammonium nitrate are explosive if the water content is below a critical amount of about 16-18% by mass. Hence, in view of safe handling of such compositions the water content is usually above 26-28% by mass. However, with increasing water content it becomes more and more difficult to achieve a stable reaction with a high output of heat.

In Russian patent application RU 2194156 C1 the FOC contains mainly the reaction product of nitric acid with an alkanolamine, alkyl amine or alkyl polyamine and up to 2.0 to 35.0% by mass of an inorganic nitrate such as ammonium nitrate, potassium nitrate, sodium nitrate or calcium nitrate. With such a composition safer handling was achieved as the amount of ammonium nitrate could be reduced substantially. However, with the usual way of igniting the FOC by means of a fuse explosion, for safety reasons a maximum mass of only 1 to 2 tons can be ignited. After decomposition of the FOC feed with a mass of 1 to 2 tons the whole operation of the FOC delivery and initiating charge insertion has to be repeated so that at an oil well with a depth of 1 to 2 km not more than about 10 tons of FOC can be reacted per day. If the oil well depth is about 3 to 4 km the amount of FOC to be reacted per day with this method decreases to about 5 tons. Hence, the extent of heating the pay zone and thus the efficacy of this method is limited.

It is therefore the object of the present invention to provide improved materials and an improved method to overcome the limitations of the prior art by considerably increasing the amount of heat generated in the pay zone of an oil well and thus allowing a profitable exploration of oil reservoirs. A further object of the present invention is to provide an apparatus for performing thermochemical treatment of an oil reservoir.

SUMMARY OF THE INVENTION

The above object is solved by providing a chemical system for thermally treating an oil reservoir by initiating a chemical reaction in a pay zone of the oil reservoir, wherein the chemical system comprises at least the following two compositions:

a thermal gas emitting composition (TGEC) being an aqueous solution or suspension comprising at least one compound selected from the group consisting of hydrazine nitrate, 1,1-di $C_{2-6}$ alkyl hydrazine nitrates and 1,2-di $C_{2-6}$ alkyl hydrazine nitrates, such as 1,1-dimethyl hydrazine nitrate or 1,2-dimethyl hydrazine nitrate, guanidine nitrate, formamide nitric acid adduct, acetamide nitric acid adduct, acetonitrile nitric acid adduct, urea nitric acid adduct, ammonium nitrate, potassium nitrate, sodium nitrate, calcium nitrate, mono, di and tri $C_{1-5}$ alkyl amine nitrates, mono, di and tri $C_{1-5}$ alkanol amine nitrates, $C_{2-6}$ alkylene diamine mono and dinitrates and poly $C_{1-5}$ alkylene polyamine polynitrates; and a reaction initiator stabilizer (RIS) being a liquid and comprising at least one compound selected from the group consisting of:
metal borohydrides $MBH_4$, wherein M is Li, Na or K;
aminoboranes $(R^1R^2R^3)N.BH_3$, wherein $R^1$, $R^2$ and $R^3$ are independently hydrogen or $C_{1-10}$ alkyl, or wherein $R^1$ is an aryl or pyridine with up to 10 carbon atoms and $R^2$ and $R^3$ are hydrogen;

dialkylaluminates MAlH$_2$R$^1$R$^2$, wherein M is Li, Na or K, and R$^1$ and R$^2$ are independently C$_{1-10}$ alkyl; aminoalanes (R$^1$R$^2$R$^3$)N.AlH$_3$, wherein R$^1$, R$^2$ and R$^3$ are independently hydrogen or C$_{1-10}$ alkyl; and aluminum or aluminum alloys with magnesium.

In the present invention two different compositions are used to initiate chemical reactions in the oil reservoir, especially in the pay zone of the oil well. The two compositions are introduced separately into the oil well such that they come into contact at the point where the chemical reaction should take place. These reactions are mainly exothermic reactions producing large amounts of heat and gases increasing the temperature of the petroleum such that the viscosity of the petroleum is reduced and its extraction is improved. As a further result of the reactions the pressure in the pay zone increases so that the recovery of the petroleum is supported. Moreover, the increased pressure creates fractures in the formation so that recovery of the petroleum is further supported.

The first composition is designated as a "thermal gas emitting composition (TGEC)" and contains the main quantity of the chemical compounds producing hot gases after a chemical reaction is initiated. The second composition is designated as a "reaction initiator stabilizer (RIS)" and has the function of initiating and maintaining the heat and gas producing reaction(s). The TGEC and the RIS are both liquids which can be introduced into the oil reservoir by means of pumps. If the used compounds are not liquid as such they are used as solutions or suspensions in an appropriate solvent. If the TGEC and the RIS are suspensions their viscosity is such that they still are pumpable and can be pumped into the oil well with a rate of up to 4-8 liters per second.

Specific examples of compounds which can be used for the TGEC are mono-, di- and triethanolamine nitrates, mono-, di- and triethylamine nitrates, polyethylene polyamine polynitrates, ethylene diamine mononitrate, ethylene diamine dinitrate, alkylidene diamine mono- and dinitrates.

For the TGEC it is preferred to use an aqueous solution or suspension comprising at least one compound selected from the group consisting of hydrazine nitrate, 1,1-di C$_{2-6}$ alkyl hydrazine nitrates and 1,2-di C$_{2-6}$ alkyl hydrazine nitrates, such as 1,1-dimethyl hydrazine nitrate or 1,2-dimethyl hydrazine nitrate, guanidine nitrate, formamide nitric acid adduct, acetamide nitric acid adduct, urea nitric acid adduct and acetonitrile nitric acid adduct.

The TGEC is preferably the reaction product of reacting nitric acid with the respective amino compounds like reacting hydrazine with nitric acid such that hydrazine nitrate is obtained. By reacting nitric acid with these amino compounds the respective nitrate compounds or nitric acid adducts are obtained.

If the TGEC contains one or more of ammonium nitrate, potassium nitrate, sodium nitrate or calcium nitrate these nitrates are contained in the TGEC with not more than 50% by mass, preferably not more than 30% by mass.

The pH value of the TGEC is preferably about 3 to 14 depending on the RIS and TGEC compositions. It is further preferred that the mixture of TGEC and RIS has a pH value <7.

For the above mentioned aminoboranes, dialkylaluminates and aminoalanes it is preferred that the alkyl moieties R$^1$, R$^2$ and R$^3$ are methyl or ethyl.

If aluminum or an aluminum alloy with magnesium is used for the RIS the aluminum or aluminum alloy can be used as a fine dispersed, pyrophoric material preferably having a particle size of about 1 µm or less and/or in the form of granules preferably having a particle size of about 0.1 to 5 mm, more preferably 1 to 2 mm.

If the temperature in the oil well has reached about 250-300° C. a suspension of such granular aluminum or aluminum alloy with magnesium in an organic solvent can be introduced into the oil well.

The aluminum is oxidized in an exothermic reaction to give aluminum oxide wherein 5 kg of Al produce a thermal energy of about 50,000 Kcal. For example, to increase the temperature of 1 kg of the productive layer formation by 100° C. a thermal energy of about 20 Kcal is to be provided, wherein increasing the temperature of 1 kg of petroleum by 100° C. requires a thermal energy of about 50 Kcal.

The oxidation of aluminum results in formation of aluminum oxide particles which deposits in the fractures formed in the pay zone to hold them open so that oil extraction is further improved.

For preparing the solution or suspension of the RIS any appropriate solvent may be used. In dependence of the materials used as the RIS such appropriate solvent may be water or an organic solvent selected from the group consisting of petrol, ligroin, white spirit, kerosene and naphtha. If, for instance, metal borohydrides or aminoboranes are used for the RIS water with a pH value >7 can be used as a solvent. For achieving such pH value ammonia or an alkali metal hydroxide can be added. If a material is used which reacts with water one or more of the above organic solvents may be used.

At the beginning of a thermochemical treatment of an oil well RIS is usually used with about 5-7% by mass with respect to the mass of TGEC injected into the oil well. After the chemical reactions are initiated it is sufficient to use about 1% by mass of RIS with respect to the mass of TGEC. With the chemical system of the present invention it is possible to react up to several hundred tons of material per day in the pay zone of an oil reservoir, being about 50-100 times the amount of material which can be reacted per day with the systems and methods known thus far. This can be achieved by continuously pumping the TGEC into the oil well and by separately pumping the RIS into the oil well, wherein the RIS can be pumped continuously or intermittently. In case the temperature at the place of reaction is in or above the range of about 200-300° C. the introduction of the RIS can be interrupted as at such temperatures the TGEC will react stably and without an additional ignition. Below about 180-200° C. the injection of RIS must be resumed.

In contrast to the FOC used in the prior art, the TGEC of the present invention does not contain an excess of oxygen and thus has no oxidizing character so that no explosive composition is created with the admixture of petroleum. The decomposition of 1 kg of TGEC results in emitting a quantity of heat of about 1000-3200 kcal.

With the chemical system of the present invention it is possible to produce more heat per time and thus to improve efficiency of the oil recovery process as it is the first time that a stable and continuous reaction can be maintained by continuously pumping reactive materials into an oil well. Until now it was the general opinion that it is not possible to initiate and maintain a stable and continuous reaction of such huge amounts of reactive materials in an oil well. With GEOVDC of the present invention it becomes further possible to recover petroleum also from oil reservoirs containing mainly high viscous petroleum which could not be efficiently recovered with the methods known thus far.

In a preferred embodiment of the present invention the RIS or TGEC can additionally contain one or more soluble metal salts of Mn, Fe, Cr, Co, Ni or V. These metals are able to catalyze an oxidation of the petroleum, so that additional heat can be produced. These metal salts are contained in the RIS in an amount of not more than 10% by mass with respect to the total mass of the RIS.

Especially preferred metal salts are $Fe(NO_3)_3$, $Mn(NO_3)_2 \cdot 6H_2O$, $Mn(SO_4) \cdot 6H_2O$, $KMnO_4$, $K_2MnO_4$, $K_2CrO_4$, $Na_2CrO_4$, $K_2Cr_2O_7$, $Na_2Cr_2O_7$, $Co(NO_3)_3$, $NH_4VO_3$, $NaVO_3$ and $KVO_3$.

The following is an overview of preferred ratios of the components contained in the GEOVDC comprising the TGEC and RIS wherein the ratios are expressed as % by mass related to the combined mass of reagents contained in the TGEC and RIS, yet without the solvents used for preparing the respective solutions or suspensions.

TABLE 1

| The TGEC compounds: | |
|---|---|
| 1. hydrazine nitrate | 30-70% by mass |
| 2. 1,1-di $C_{2-6}$ alkyl hydrazine nitrates and 1,2-di $C_{2-6}$ alkyl hydrazine nitrates, such as 1,1-dimethyl hydrazine nitrate or 1,2-dimethyl hydrazine nitrate | |
| 3. guanidine nitrate | |
| 4. formamide nitric acid adduct | |
| 5. acetamide nitric acid adduct | |
| 6. acetonitrile nitric acid adduct | |
| 7. urea nitric acid adduct | |
| The TGEC compounds: | |
| 1. Mono-, di- and triethanolamine nitrates | if present at least 10% by mass |
| 2. Mono-, di- and tri $C_{1-5}$ alkyl amine nitrates, such as Mono-, di- and tri-ethylamine nitrates | |
| 3. Polyethylene-polyamine polynitrate | |
| 4. $C_{1-5}$ alkylidene diamine mono- and dinitrate, such as Ethylenediamine mononitrate or Ethylenediamine dinitrate | |
| The RIS compounds: | |
| 1. metal borohydrides $MBH_4$ | 1-10% by mass |
| 2. aminoboranes $(R^1R^2R^3)N \cdot BH_3$ | 0.5-5% by mass |
| 3. dialkylaluminates $MAlH_2R^1R^2$ | 1.5-7% by mass |
| 4. aminoalanes $(R^1R^2R^3)N \cdot AlH_3$ | 3-10% by mass |
| 5. aluminum or aluminum alloys with magnesium. | 0.3-70% by mass |
| Soluble salts of Mn, Fe, Cr, Co, Ni or V | 1-4% by mass |
| Ammonium nitrate, potassium nitrate, sodium nitrate, calcium nitrate | 0-50% by mass |

The method according to the present invention for increasing the amount of heat generated in the pay zone of an oil well and thus allowing a profitable exploration of oil reservoirs is characterized in that the above described chemical system is used wherein the thermal gas emitting composition (TGEC) and the reaction initiator stabilizer (RIS) are separately introduced into the oil reservoir and are contacted in the pay zone of the oil reservoir to initiate a chemical reaction producing heat and gases.

It is preferred to introduce the TGEC continuously into the oil reservoir and to introduce the RIS simultaneously with the TGEC and in a continuous or intermittent way.

With the method of the present invention the TGEC and RIS can be pumped into the oil reservoir with a rate of about 4-8 liters per second.

A specific embodiment of the method according to the present invention comprises the steps of:
a) introducing granules of aluminum or an aluminum/magnesium alloy as the RIS into an oil well of the oil reservoir and keeping the granules in a reaction chamber located in the oil well;
b) introducing the TGEC into the oil well so that it contacts the granules kept in the reaction chamber for initiating and maintaining a thermochemical reaction producing heat and gases;
c) passing the produced hot gases into the pay zone of the oil reservoir;
d) shifting the thermochemical reaction into the pay zone of the oil reservoir by allowing the granules to enter into the pay zone; and
e) contacting the granules in the pay zone with the TGEC introduced into the oil well.

In the above method the reaction chamber is located in or adjacent to the pay zone of the oil reservoir. The exact location of the reaction chamber depends on the construction of the apparatus used and of the construction of the oil well. Practically, the reaction chamber may extend up to 500-600 m above the pay zone and may even extend several meters to several tens of meters below the pay zone.

A preferred TGEC compound for reacting with the granules of aluminum or aluminum/magnesium alloy is urea nitric acid adduct, the reaction product of urea with nitric acid.

The pH value in the reaction chamber is in the range of pH 3-14, wherein a pH of about 3-4 is preferred as then the hydrogen gas produced by the thermochemical reaction is oxidized to $H_2O$ so that the amount of produced heat is increased by about 30%.

In the step of shifting the thermochemical reaction into the pay zone the thermochemical reaction and thus the granules are shifted into fractures present in the pay zone. This allows a direct heating of the surrounding of the fractures so that the fractures can be increased with respect to their length and volume.

This step of shifting the thermochemical reaction into the pay zone is preferably carried out when the pay zone is heated up to about 300° C.

The method according to the present invention may further comprise a step of contacting the granules in the pay zone with at least one strong oxidizing agent such as potassium dichromate $K_2Cr_2O_7$. These strong oxidizing agents support the production of large amounts of energy and of solid metal oxides like $Al_2O_3$ which function as proppants (propping agents) to hold the fractures open.

When sufficient high temperature and pressure are reached in the pay zone and hydrogen is present as a result of the reaction of the aluminum or aluminum/magnesium alloy with the TGEC the petroleum in the oil reservoir is subjected to a hydrocracking process.

With hydrocracking the viscosity of the petroleum in the treated oil reservoir is considerably reduced as in addition to the increased temperature in the pay zone the more complex hydrocarbon molecules are broken down to simpler hydrocarbon molecules.

The hydrocracking process may be further supported by adding suitable metal catalysts such as metal salts of Mn, Fe, Cr, Co, Ni or V.

A large number of oil wells, especially older oil wells, are contaminated or damaged by water contents. With the method of the present invention using aluminum or aluminum/magnesium alloys the amount of water present in the oil well can be reduced. During reaction of the aluminum or aluminum/magnesium alloys under alkaline conditions water is consumed. Further, the metal hydroxides resulting from the reaction of aluminum or aluminum/magnesium alloys have the characteristic of adsorbing or bonding water like in the form of water of crystallization.

It is also possible to achieve a thermal cracking of the petroleum by further increasing the temperature in the pay zone. However, the process of hydrocracking as described above is preferred as it is more effective and it reduces the amount of water present in the pay zone.

The hydrocracking process in the pay zone of an oil well has never been described before. It is a very effective method of a thermochemical treatment of an oil reservoir and thus allows profitable exploration of oil reservoirs.

In another specific embodiment of the method according to the present invention the TGEC and RIS are introduced in the form of fluid layers separated by layers of a spacer fluid. With this method it becomes possible to introduce the TGEC and RIS into the oil well through one tube and still achieve a separate but continuous supply of TGEC and RIS.

A further embodiment of the method according to the present invention comprises the steps of:
a) introducing granules of aluminum or an aluminum/magnesium alloy as the RIS into an oil well of the oil reservoir and keeping the granules in a first reaction chamber located in the oil well;
b) introducing a first TGEC into the oil well so that it contacts the granules kept in the first reaction chamber for initiating and maintaining a thermochemical reaction producing thermal energy and heating up the walls of the first reaction chamber;
c) introducing a second TGEC into the oil well such that it comes in contact with the heated walls of the first reaction chamber and is ignited;
d) passing the ignited TGEC to a second reaction chamber where the TGEC reacts under production of heat and gases; and
e) passing the produced hot gases into the pay zone of the oil reservoir.

In this specific embodiment an apparatus may be used comprising a heat-resistant beaker with a perforated bottom at the lower end of a tubing inserted into the oil well, so that the RIS granules will be kept in the beaker and can be contacted with the first TGEC introduced in the tubing. The section of the tubing with the attached beaker forms the first reaction chamber and will be heated by the thermochemical reaction. The second TGEC will be passed along the outside of this tubing section and thus will be heated to a temperature sufficiently high to induce ignition of the second TGEC.

In this method the beaker should be of such resistance that it withstands the chemical and thermal conditions during the thermochemical treatment. In contrast thereto, if the above method further comprises a shifting of the thermochemical reaction into the pay zone this beaker may be fabricated of a material which gradually disintegrates under the chemical and thermal conditions. Such material may be aluminum or an aluminum/magnesium alloy, for instance, which will react with the TGEC provided to the beaker or which will burn down at high temperatures.

The apparatus for performing thermochemical treatment of an oil reservoir according to the present invention allow separate introduction of the thermal gas emitting composition (TGEC) and the reaction initiator stabilizer (RIS) described above and the contacting of the TGEC and RIS in or near the pay zone of the oil well to be treated. Such apparatus comprise:
an outer tubing inserted in a casing of the oil well such that an outer annular space between the outside of the outer tubing and the inside of the casing is provided, wherein the lower end of the outer tubing is located in or above the pay zone of the oil well;
a packer being positioned above the lower end of the outer tubing and sealing the outer annular space;
an inner tubing inserted in the outer tubing, such that an inner annular space between the outside of the inner tubing and the inside of the outer tubing is provided, wherein the inner tubing allows the supply of one of the TGEC or RIS to the pay zone and the inner annular space allows the supply of the other one of the TGEC or RIS to the pay zone, and wherein the lower end of the inner tubing is located in or above the pay zone;
wherein at least one of the lower end of the outer tubing and the lower end of the inner tubing is located in the pay zone of the oil well; and
a mixing device contacting the TGEC and the RIS in the pay zone of the oil well.

The mixing device of such apparatus can be embodied by a sealed lower end of the outer tubing being located above the lower end of the inner tubing but below the packer; and openings in the inner tubing allowing a fluid exchange between the inner annular space and the inner tubing, wherein the openings are located at a distal section of the inner tubing but above the lower end of the outer tubing.

The openings are preferably embodied as slot jet nozzles having tubular connecting passages extending diagonal through the inner tubing and comprising a slot.

The slots are preferably formed in a lower half of the tubular connecting passages.

In a specific embodiment of such apparatus a beaker is inserted in the inner tubing below the openings in this tubing, wherein this beaker comprises openings in its bottom allowing the passage of the mixed fluids but not of granular material supplied with the RIS through the inner tubing. That is, the openings in the bottom have a smaller diameter than the granules supplied with the RIS.

The beaker can be made of aluminum or an aluminum/magnesium alloy if it is intended that the beaker has a limited lifetime during the thermochemical treatment so that after a predetermined time the granules are no longer kept in the oil well but are forced into the pay zone and into the fractures formed therein.

In another specific embodiment of the apparatus according to the invention there is at least one turbine mixing device in the inner tubing below the openings in the tubing, wherein the turbine mixing device comprises a shaft being supported by means of at least one plain bearing and carrying turbine vanes and mixing vanes. The plain bearing additionally comprises openings allowing the passage of the fluids flowing through the inner tubing. Further, the turbine vanes transmit energy from the flowing fluids to the shaft to rotate the shaft with the attached mixing vanes and thus to mix the fluids. With such turbine mixing device the mixing can be improved compared to the above described slot jet nozzles.

In the apparatus according to the present invention the mixing device may further be embodied by the lower end of the inner tubing being located above the lower end of the outer tubing; and by at least one turbine mixing device being arranged in the outer tubing below the lower end of the inner tubing, wherein the turbine mixing device comprises a shaft being supported by means of at least one plain bearing and carrying turbine vanes and mixing vanes. Additionally, the plain bearing comprises openings allowing the passage of the fluids flowing through the inner tubing. The turbine vanes transmit energy from the flowing fluids to the shaft to rotate the shaft with the attached mixing vanes so that the fluids are mixed.

For stable support of the shaft the above described turbine mixing devices comprise preferably two plain bearings.

In case more than one turbine mixing device is arranged in the apparatus described above the mixing can be further improved if consecutive turbine mixing devices have opposite directions of rotation.

The mixing device for the apparatus according to the present invention may alternatively be embodied by the lower end of the inner tubing being located above the lower end of the outer tubing; and by a beaker inserted in the lower end of the inner tubing, wherein the beaker comprises openings in its bottom allowing the passage of the fluids supplied through the inner tubing except the granular material supplied with the RIS.

As already mentioned above, the beaker can be made of aluminum or an aluminum/magnesium alloy.

An alternative embodiment for an apparatus according to the present invention comprises:
- a tubing inserted in a casing of the oil well such that an annular space between the outside of the tubing and the inside of the casing is provided, wherein a lower end of the tubing is located in or above the pay zone of the oil well;
- a packer being positioned above the lower end of the tubing and sealing the annular space;
- a beaker inserted in the lower end of the tubing, the beaker comprises openings in its bottom allowing the passage of the TGEC and RIS but not of granular material supplied with the RIS through the tubing.

This beaker can also be made of aluminum or an aluminum/magnesium alloy.

With such apparatus a separate supply of TGEC and RIS is achieved by pumping the fluids in the form of fluid layers through the tubing. To avoid mixing and reaction of the TGEC and RIS layers before reaching the pay zone a layer of a spacer fluid is arranged between the layers of TGEC and RIS.

In the alternative apparatus described above the packer may comprise sensing elements for measuring the temperature of the packer and the pressure under the packer. This allows for better control of the thermochemical treatment process.

The alternative apparatus described above may further comprise at least one reaction chamber in which the TGEC and RIS are reacted.

With respect to the apparatus and methods of the present invention preferred embodiments are described in the following, wherein references to the enclosed figures are made.

APPARATUS ACCORDING TO THE INVENTION

Figure 1:
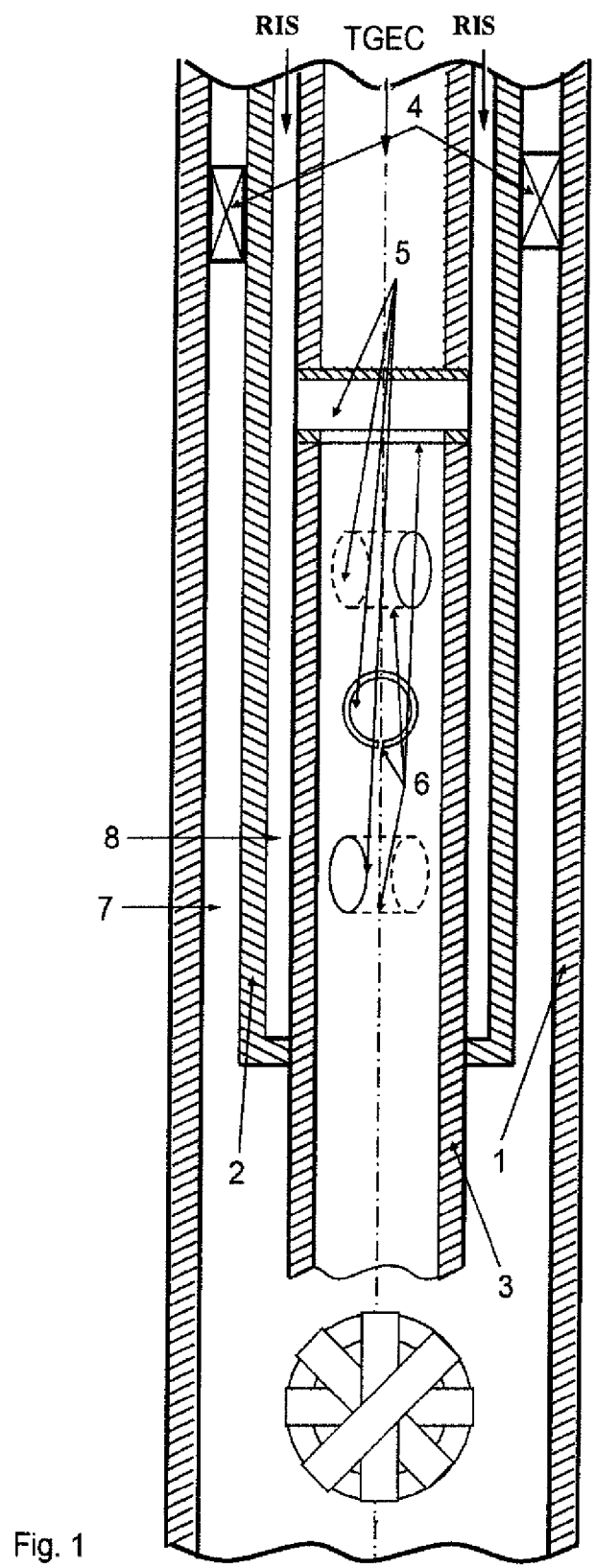
FIG. 1 shows an apparatus according to a first preferred embodiment of the invention.

Following describes apparatus for thermally treating an oil reservoir by separately introducing the thermal gas emitting composition (TGEC) and the reaction initiator stabilizer (RIS) of the above described chemical system in an oil well of the oil reservoir.

The apparatus according to the present invention for performing such thermochemical treatment comprises:
- an outer tubing inserted in a casing of the oil well such that an outer annular space between the outside of the outer tubing and the inside of the casing is provided, wherein the lower end of the outer tubing is located in or above the pay zone of the oil well;
- a packer being positioned above the lower end of the outer tubing and sealing the outer annular space;
- an inner tubing inserted in the outer tubing, such that an inner annular space between the outside of the inner tubing and the inside of the outer tubing is provided, wherein the inner tubing allows the supply of one of the TGEC or RIS to the pay zone and the inner annular space allows the supply of the other one of the TGEC or RIS to the pay zone, and wherein the lower end of the inner tubing is located in or above the pay zone;
- wherein at least one of the lower end of the outer tubing and the lower end of the inner tubing is located in the pay zone of the oil well; and
- a mixing device contacting the TGEC and the RIS in the pay zone of the oil well.

With this apparatus it is possible to separately supply the TGEC and the RIS through the oil well to the pay zone where the two compositions are mixed by means of a mixing device.

The mixing device of the apparatus further comprises at least one reaction chamber in which the TGEC and RIS are reacted.

The mixing device may be embodied by a sealed lower end of the outer tubing being located above the lower end of the inner tubing and below the packer and by openings in the inner tubing allowing a fluid exchange between the inner annular space and the inner tubing. These openings are located at a distal section of the inner tubing but above the lower end of the outer tubing.

One of the factors affecting the efficiency of the method for thermally treating an oil reservoir is the speed of heat production which depends on the mixing speed of the reagents and on their contact time in a reaction chamber. The contact time can be extended by increasing the length of the tubing below the openings. The tubing section below the openings is designated as a reaction chamber or reactor.

For embodiments where granules of aluminum or an aluminum/magnesium alloy are retained in a tubing (by means of a beaker with a perforated bottom, as will be described later) the part of the tubing filled with the granules can be designated as the reaction chamber or reactor.

Further, in case such granules of aluminum or an aluminum/magnesium alloy are deposited in fractures in the productive layer also the volumes of such fractures may be designated as a reaction chamber or reactor.

Different factors like the structure of the productive layer to be treated, the compositions of oil and natural gas in this productive layer, the oil well design, and, in particular, how far the packer is placed above the productive layer have an influence on what specific embodiment of an apparatus or a method according to the invention is best for an effective thermochemical treatment of the productive layer.

For instance, the packer cannot be placed to far from the heated productive layer, yet the packer at the same time cannot be heated up to much.

Therefore, different embodiments of an apparatus and a method for thermally treating an oil reservoir will be described in the following.

For instance, the apparatus according to a first and second embodiment comprise no movable parts and are thus most reliable. The apparatus according to a first embodiment, however, can be applied only in combination with a reaction chamber having a length of no less than 80-100 meters. At a length of only 10-15 m, the efficiency index of such apparatus is small.

If it is necessary to restrict the length of the reaction chamber to about 10-15 m the apparatus according to the second, third and fourth embodiment can be used as the mixing devices used therein have a higher efficiency. In these embodiments no more than 10% of the chemical energy supplied with the TGEC and RIS is used for rotating a turbine mixing device and thus for mixing the fluids.

First Embodiment of an Apparatus

FIG. 1 shows a first embodiment of an apparatus for performing a thermochemical treatment of an oil reservoir. An outer tubing (2) having a diameter of about 2⅞ inch (7.30 cm) is inserted in a casing (1) of an oil well such that an outer annular space (7) between the outside of the outer tubing and the inside of the casing is provided. An inner tubing (3) having a diameter of about 1½ inch (3.81 cm) is inserted in the outer tubing (2), such that an inner annular space (8) between the outside of the inner tubing and the inside of the outer tubing is provided. The lower end of the inner tubing (not shown) is located in the pay zone and the lower end of the outer tubing is located a given distance above the lower end of the inner tubing and thus in or above the pay zone of the oil well. The lower end of the outer tubing is sealed by attaching it to the outside of the inner tubing. Further, a packer (4) is positioned above the lower end of the outer tubing and seals the outer annular space so that no fluid can flow into the outer annular space (7). To avoid a thermal overload of the packer it is preferred that the packer is located a sufficient distance in flow direction of the supplied fluids before the first opening in the inner tube. The packer may further comprise sensing elements for measuring the temperature of the packer and the pressure under the packer.

The inner tubing allows the supply of one of the TGEC or RIS to the pay zone and the inner annular space and allows the supply of the other one of the TGEC or RIS to the pay zone. At a distal section of the inner tubing but above the lower end of the outer tubing are provided four slot jet nozzles. These slot jet nozzles are embodied by tubular connecting passages (5) extending diagonal through the inner tubing and comprising a slot (6). By means of these slot jet nozzles the fluid supplied through the inner annular space flows into the tubular connecting passages and through the slot (6) so that it is distributed in and thus mixed with the fluid supplied through the inner tubing. It is of course possible to provide more than four slot jet nozzles. For a better mixing effect the slot jet nozzles can be arranged such that two adjacent slot jet nozzles are axially offset by a given angle. It is further preferred that the slots are formed in a lower half of the tubular connecting passages. In the preferred embodiment of FIG. 1 the slot jet nozzles are axially offset by 45° and the slots are formed at the lowest point of the tubular connecting passages, i.e. in flow direction of the fluid supplied through the inner tubing. The resulting staggered arrangement of the slot jet nozzles as a view from the lower end of the inner tubing is shown in the lower part of FIG. 1.

In this apparatus it is preferred to supply the TGEC through the inner tubing and to supply the RIS through the inner annular space.

The length of the inner tubing below the lowest opening (slot jet nozzle) forms a reaction chamber in which the mixed TGEC and RIS react under production of heat and gases. The reaction chamber may have a length of up to 100 m or more and allow the reaction of up to 15 tons of reagents per hour with a high reaction efficiency of approximately 90%. That is, approximately 90% of the energy obtained by reacting all the materials supplied to the reaction chamber will be available for thermochemically treating the oil reservoir. The heated reaction products enter in the oil reservoir and increase the pressure under the packer so that new cracks or fractures are formed in the productive layer.

The apparatus shown in FIG. 1 is preferably used in oil wells where the packer is located at a distance of no more than 100 m from the productive layer and is characterized in that it has a simple structure without any movable parts and that as a result of the long reaction chamber a high reaction efficiency is provided.

Second Embodiment of an Apparatus

Figure 2:
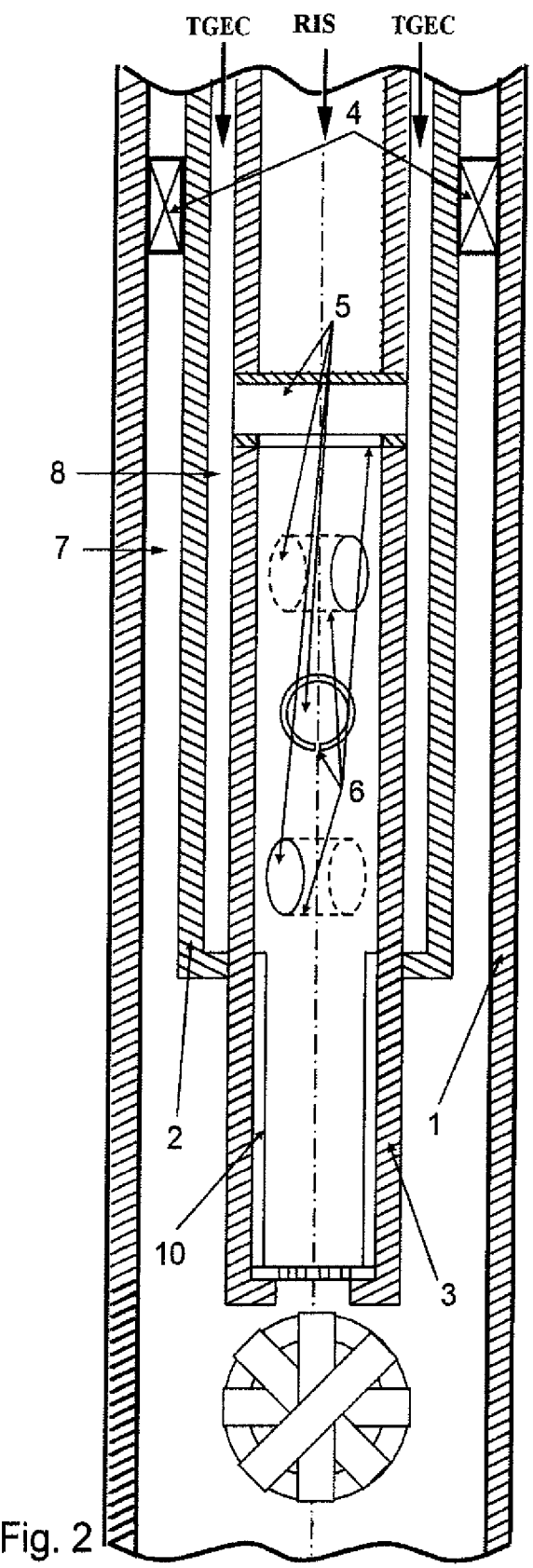
FIG. 2 shows an apparatus according to a second preferred embodiment of the invention.

In case the packer is located no more than 10-15 m above the productive layer it is preferred to use an apparatus according to a second embodiment shown in FIG. 2. The apparatus according to the second embodiment comprises a beaker (10) being inserted in the inner tubing below the lowest opening in the inner tubing. The beaker comprises openings in its bottom allowing the passage of the mixed fluids and has a length of up to 4 m, preferably 3-4 m.

The openings in the bottom of the beaker (10) have such dimensions that granular material cannot pass and thus are kept in the beaker, so that for instance granules of aluminum or aluminum/magnesium alloy being supplied as a suspension through the inner tubing are retained in the beaker as their particle diameter is larger than the diameter of the openings in the bottom of the beaker.

The beaker may further be made from a material having a limited lifetime during the conditions of use. That is, the beaker is constructed such that after a calculated time of passing fluids through the beaker its bottom breaks down so that the granular material retained therein is flushed into the productive layer. The beaker is preferably made of aluminum or an aluminum/magnesium alloy which dissolves when contacted with acidic or alkaline fluids or burns down in case of high temperatures of about 700° C. or higher.

Third Embodiment of an Apparatus

The following describes a further embodiment of an apparatus for performing thermochemical treatment of an oil reservoir. The present embodiment comprises at least one turbine mixing device being arranged in the inner tubing below the openings. The turbine mixing device comprises a shaft being supported by means of at least one plain bearing and carrying turbine vanes and mixing vanes, wherein the plain bearing comprises openings allowing the passage of the flowing fluids and wherein the turbine vanes transmit energy from the flowing fluids to the shaft to rotate the shaft with the attached mixing vanes. The section of the inner tubing with a diameter of about 1½ inch (3.81 cm) below the turbine mixing device forms the reaction chamber of this apparatus. The section of the inner tubing between the first openings and the first turbine mixing device can be designated as a pre-chamber. Approximately ¹⁄₁₀ of the reagents react in this pre-chamber and the produced energy is at least partly used to drive the turbine mixing device(s) arranged downstream of the pre-chamber.

Figure 3:
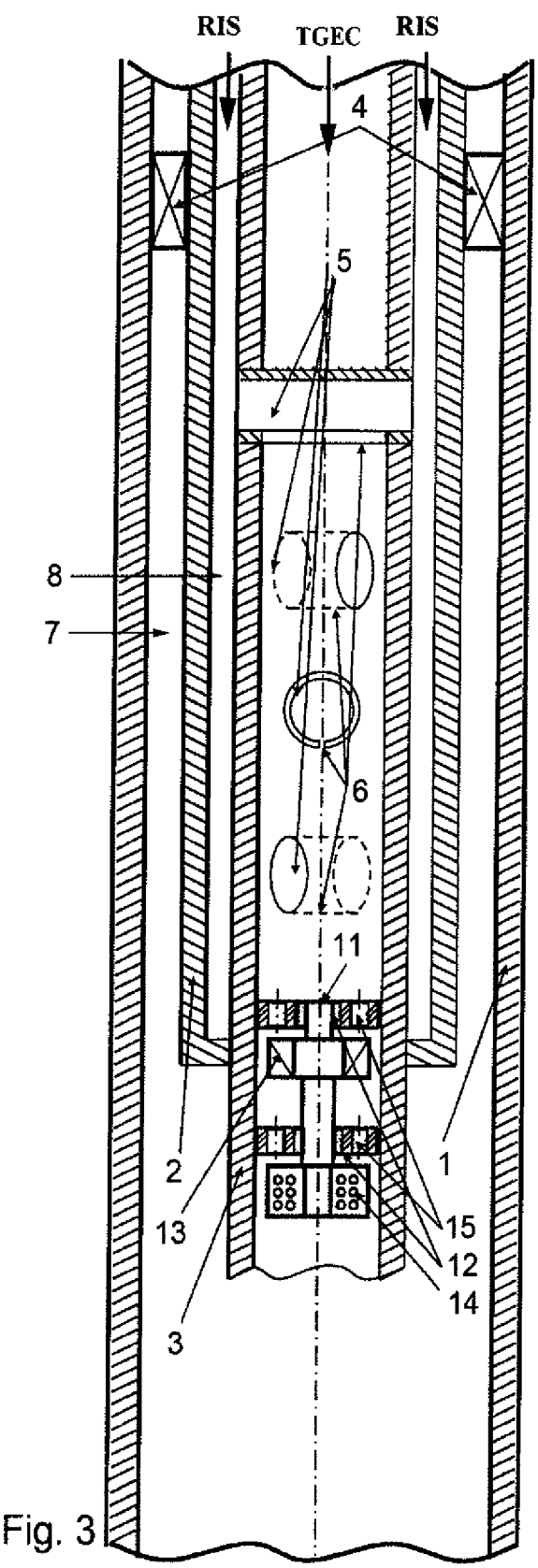
FIG. 3 shows an apparatus according to a third preferred embodiment of the invention.

In FIG. 3 a specific embodiment of an apparatus according to a third embodiment is shown. In this specific embodiment the shaft (11) is supported by means of two plain bearings (12) comprising openings (15) allowing the passage of the flowing fluids. The shaft (12) carries turbine vanes (13) and mixing vanes (14), wherein the turbine vanes are arranged prior to the mixing vanes with respect to the flow direction of the fluids. The turbine vanes transmit energy from the flowing fluids to the shaft to rotate the shaft with the attached mixing vanes and the rotated mixing vanes improve mixing of the TGEC and RIS. In the present embodiment the mixing vanes (13) are perforated plates.

Fourth Embodiment of an Apparatus

The following describes an apparatus for performing thermochemical treatment of an oil reservoir according to a fourth preferred embodiment. The mixing device of the apparatus is embodied by the lower end of the inner tubing (3) being located above the lower end of the outer tubing (2) and by at least one turbine mixing device being arranged in the outer tubing below the lower end of the inner tubing. The turbine mixing device described above for the third embodiment can be used.

If two or more turbine mixing devices are arranged it is preferred that consecutive turbine mixing devices have opposite directions of rotation.

Figure 4:
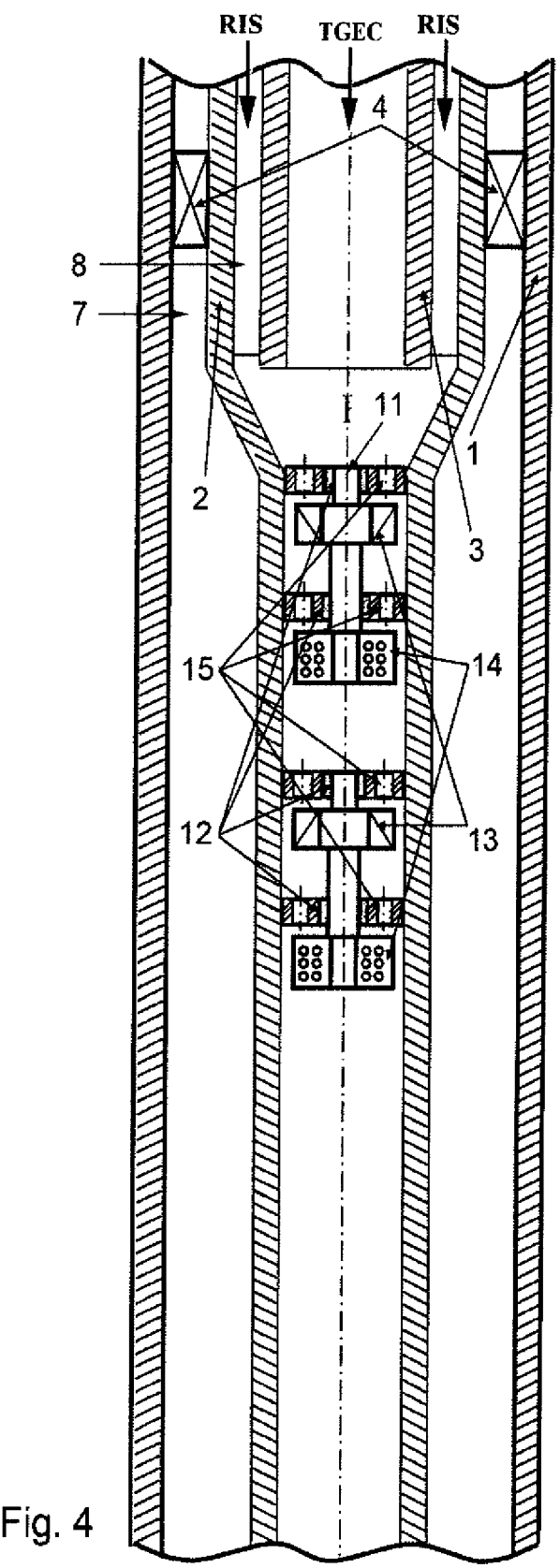
FIG. 4 shows an apparatus according to a fourth preferred embodiment of the invention.

A specific embodiment of such apparatus is shown in FIG. 4. It comprises two turbine mixing devices having opposite directions of rotation. Further, in this embodiment the outer tubing (2) is tapered between the lower end of the inner tubing (3) and the first turbine mixing device.

Like in the previous embodiment, the section of the inner tubing with a diameter of about 1½ inch (3.81 cm) below the turbine mixing devices forms the reaction chamber of the present apparatus. The cone shaped section of the outer tubing (2) can be designated as a pre-chamber.

Fifth Embodiment of an Apparatus

Figure 5:
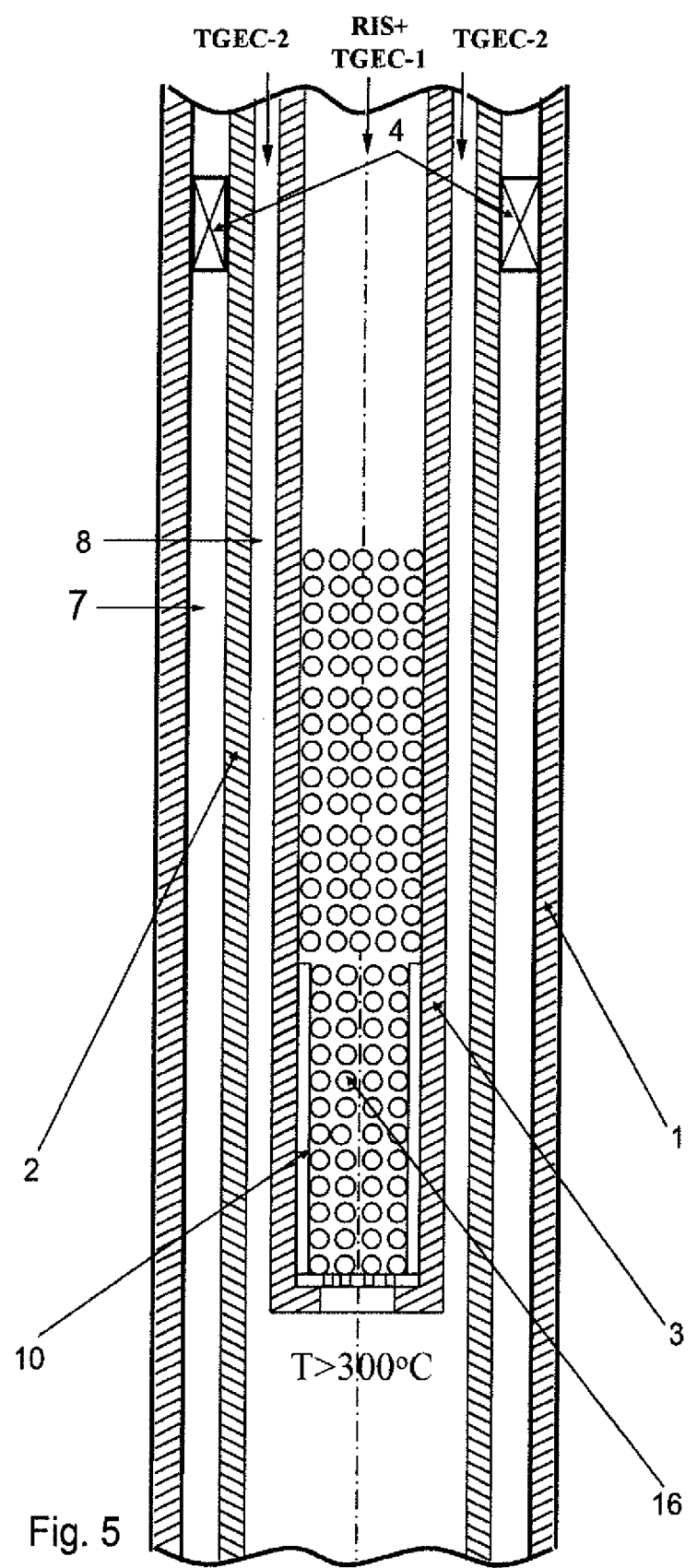
FIG. 5 shows an apparatus according to a fifth preferred embodiment of the invention.

In FIG. 5 is shown a fifth embodiment of an apparatus for performing thermochemical treatment of an oil reservoir according to the present invention. The apparatus according to the fifth embodiment comprises no openings in the inner tubing which allow a fluid exchange with the inner annular space (8). In the apparatus according to the fifth embodiment the mixing device is embodied by the lower end of the inner tubing (3) being located above the lower end of the outer tubing (2) and by a beaker (10) inserted in the lower end of the inner tubing. This beaker comprises openings in its bottom allowing the passage of the fluids supplied through the inner tubing except the granular aluminum material (16) supplied with the RIS. That is, when granules of aluminum or aluminum/magnesium alloy are supplied as a suspension through the inner tubing the granules are retained in the beaker as their particle diameter is larger than the diameter of the openings in the bottom of the beaker.

The section of the inner tubing filled with the granules can be regarded as a first reaction chamber. The heat produced in this reaction chamber heats up the fluid (TGEC) pumped through the inner annular space (8) so that the TGEC is ignited without the use of any further RIS. The section of the outer tubing below the lower end of the inner tubing can be regarded as a second reaction chamber.

If the apparatus according to the fifth embodiment is used with the method of the third embodiment high temperatures of up to about 600-700° C. are achieved in the first reaction chamber so that the beaker should be made from heat-resistant material.

However, if this apparatus is used for the hydrocracking method (fourth embodiment of a method) a beaker (10) of the same type as described above for the embodiment 2 can be used. Hence it is preferred that this beaker is made of aluminum or an aluminum/magnesium alloy.

Sixth Embodiment of an Apparatus

Figure 6:
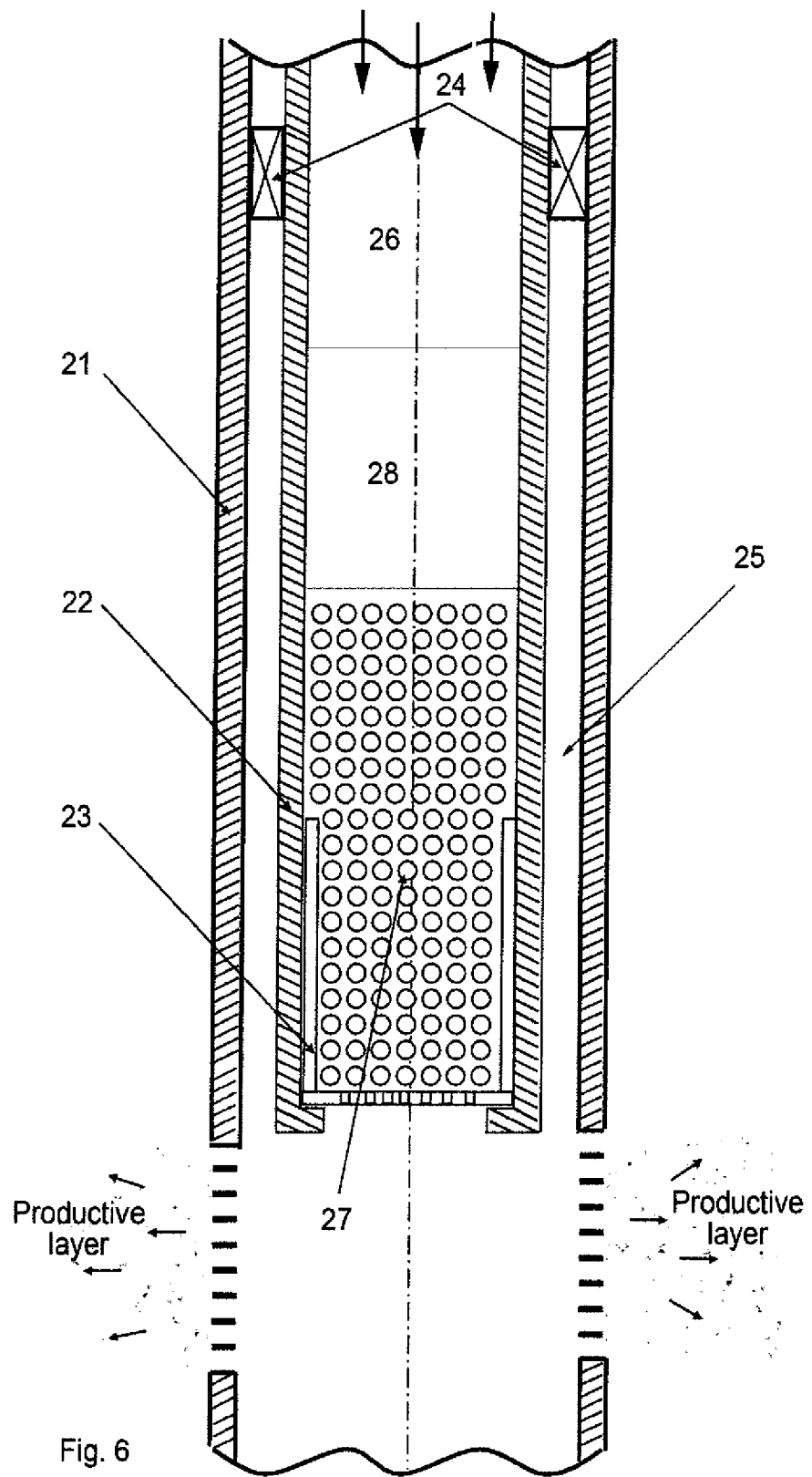
FIG. 6 shows an apparatus according to a sixth preferred embodiment of the invention.

A sixth embodiment of an apparatus for performing thermochemical treatment of an oil reservoir according to the present invention is shown in FIG. 6. The apparatus comprises only one tubing (22) with a diameter of about 2⅞ inch (7.30 cm) inserted in the oil well. This tubing (22) is inserted in the casing (21) of the oil well such that an annular space (25) between the outside of the tubing (22) and the inside of the casing (21) is provided, wherein a lower end of the tubing (22) is located in or above the pay zone of the oil well. A packer (24) sealing the annular space (25) is positioned above the lower end of the tubing (22). A beaker (23) is inserted in the lower end of the tubing, wherein the beaker comprises openings in its bottom allowing the passage of the TGEC and RIS but not of granular material supplied with the RIS through the tubing.

The same type of beaker as described above for the embodiment 2 can be used. In that case, it is preferred that the beaker is made of aluminum or an aluminum/magnesium alloy. In that case, it is intended that the beaker does not disintegrate during use of the apparatus the beaker is made of a material having sufficient resistance under the thermal and chemical conditions present in the oil well during a method of thermochemical treatment.

The apparatus according to the sixth embodiment is used by pumping TGEC (26) and RIS (27) in forms of layers being separated by a layer of an inert fluid or spacer fluid (28).

The section of the tubing filled with the granular material forms the reaction chamber of the present apparatus.

It should be generally noted that in the above described apparatus according to the present invention comprising a beaker for keeping RIS granules the beaker may be designed differently to fulfill the requirements of the method of thermochemical treatment for which the apparatus is used. For instance, the lifetime of the beaker under the chemical and thermal conditions in the oil well can be adjusted by using a more or less resistant material or by adapting the thickness of the bottom of the beaker. If it is intended that the beaker does not disintegrate during the thermochemical treatment it is prepared of a respectively resistant material.

METHODS ACCORDING TO THE INVENTION

First Embodiment of a Method

In a first embodiment of a method of thermally treating an oil reservoir the apparatus shown in FIG. 1, 3 or 4 can be used wherein it is preferred to supply the TGEC through the inner tubing and to supply the RIS through the inner annular space wherein both compositions are supplied as pumpable solutions or suspensions.

Second Embodiment of a Method

In a second embodiment of a method of thermally treating an oil reservoir the apparatus according to the second embodiment as depicted in FIG. 2 is used wherein the RIS is supplied through the inner tubing (3) and the TGEC is supplied through the inner annular space (8). As the RIS granular aluminum or aluminum alloy with magnesium is used the granular material is supplied in the form of a suspension. The openings in the bottom of the beaker (10) have such dimensions that the granular material cannot pass and thus are kept in the beaker. For this embodiment the amount of TGEC used is about 2-3 times the amount of aluminum wherein this ratio refers to the mass of the reagents as such without the solvent(s) used to prepare the pumpable solutions or suspensions. As a preferred TGEC compound the reaction product of reacting urea with nitric acid, i.e. urea nitric acid adduct, is used. With this embodiment up to 3 tons of reagents can be reacted per hour. The hot reaction products resulting from the reaction of the aluminum or aluminum/magnesium alloy comprise gaseous hydrogen. The pH value may range from 3 to 14, however, a pH of 3-4 is preferred as then the produced hydrogen can be oxidized thus increasing the amount of produced heat by about 30%. With this method of thermochemical treatment a high pressure under the packer is achieved so that new fractures are created in the productive layer.

This second embodiment of a method can be modified by shifting the reaction into the fractures of the productive layer as described below in the fifth embodiment of a method.

Third Embodiment of a Method

For this method the apparatus according to the fifth embodiment can be used. First, a suspension of granular aluminum or aluminum/magnesium alloy is pumped as a suspension into the inner tubing (3) so that at the lower end of the inner tubing where a heat-resistant beaker (10) is inserted the granular material is retained to form a layer (16) of granular material with a height up to about 200-300 m. Then a first TGEC is pumped into the inner tubing so that reactions are initiated and thermal energy is produced in the first reaction chamber. In this method hot gases with a temperature of up to 600-700° C. can be produced. The heat produced in the first reaction chamber heats up the walls of the first reaction chamber, that is the distal end of the inner tubing, and thus the fluid (second TGEC) pumped through the inner annular space (8) so that the TGEC is ignited without the use of any further RIS. The ignited TGEC flows through the second reaction chamber, i.e. the distal section of the outer tubing (2) below the beaker, where the TGEC reacts under production of heat and gases.

Fourth Embodiment of a Method

A specific method of thermally treating an oil reservoir uses the process of hydrocracking of the petroleum in the oil reservoir. Under high temperature and pressure and the presence of gaseous hydrogen complex hydrocarbon molecules are broken down to simpler hydrocarbon molecules.

For this method the specific embodiments of an apparatus according to the invention as shown in FIG. 2 and FIG. 5 can be used. Both apparatus are characterized in that they comprise a beaker at the lower end of the inner tubing which can retain and keep granules of aluminum or its alloys with magnesium supplied with the RIS. For this method the beaker is also made of aluminum.

At the beginning a suspension of granules of aluminum or an aluminum/magnesium alloy as part of the RIS is supplied through the inner tubing to the aluminum beaker. There it is contacted with the TGEC supplied through the inner annular space (second embodiment shown in FIG. 2) or the inner tubing (fifth embodiment shown in FIG. 5) wherein the TGEC has preferably a pH value of about 3 or 14 so that hydrogen is evolved. The hot reaction products enter into the oil reservoir, heat up the productive layer and increase the pressure under the packer so that new fractures are formed in the productive layer. Like in the second embodiment of a method urea nitric acid adduct is preferably used as a TGEC compound and in an amount of about 2-3 times the amount of aluminum used.

Further, if a pH of 3-4 is used the produced hydrogen gas can be oxidized thus increasing the amount of produced heat.

After the increase of temperature and pressure and the formation of fractures in the productive layer the reaction zone is shifted from the oil well into the productive layer. This is achieved by an allowed disintegration of the aluminum beaker resulting from the acidic or alkaline conditions. That is, after about 10-30 minutes of pumping a solution with a pH value of about 3 or 14 through the beaker the bottom of the beaker breaks down and the granules are forced into the fractures of the productive layer.

This reaction zone shift is preferably performed after the vicinity of the fractures has reached a temperature of about 300° C. This shifting further reduces the thermal load of the packer and the tubings as the supplied fuels now can cool down the packer and the tubings.

As a result of this shifting the temperature of the productive layer is further increased as now the reaction of aluminum or its alloys with magnesium with the acidic or alkaline TGEC solutions takes place in the fractures. This results in temperatures of up to 400-500° C., a further increased pressure and the presence of hydrogen. As above temperatures of 300-350° C. the hydrocracking process starts the petroleum in the productive layer now undergoes hydrocracking to smaller molecules so that the viscosity of the petroleum is reduced.

The hydrocracking process may be further improved by supplying catalytically active compounds to the place of reaction. As such catalysts the above mentioned soluble metal salts of Mn, Fe, Cr, Co, Ni or V may be used which can be added to the RIS or TGEC. With respect to the total mass of the RIS such metal salts may be contained in the RIS in an amount of not more than 10% by mass.

Especially preferred metal salts are $Fe(NO_3)_3$, $Mn(NO_3)_2 \cdot 6H_2O$, $Mn(SO_4) \cdot 6H_2O$, $KMnO_4$, $K_2MnO_4$, $K_2CrO_4$, $Na_2CrO_4$, $K_2Cr_2O_7$, $Na_2Cr_2O_7$, $Co(NO_3)_3$, $NH_4VO_3$, $NaVO_3$ and $KVO_3$.

During the process of hydrocracking of the petroleum the injection of any oxidizing compounds into the layer should be avoided so that the produced hydrogen is spent for the hydrocracking process only.

After the granules of aluminum or its alloys with magnesium are exhausted the layer can be heated up again by supplying TGEC and RIS and the hydrocracking process can be initiated by supplying the next portion of granules. This leads to a cyclic reaction control of increasing heat and pressure in the productive layer and of performing the hydrocracking process.

This hydrocracking process results in a considerably reduced viscosity of the petroleum in the treated oil reservoir as in addition to the increased temperature in the pay zone the more complex hydrocarbon molecules are broken down to simpler hydrocarbon molecules.

A further beneficial effect of the use of the aluminum or aluminum/magnesium alloys in this process is the reduction of the amount of water present in the oil well. During reaction of the aluminum or aluminum/magnesium alloy under alkaline conditions water is consumed. Further, the metal hydroxides resulting from the reaction of aluminum or aluminum/magnesium alloys have the characteristic of adsorbing or bonding water like in the form of water of crystallization. These effects can be used to reduce the amount of water in oil wells being contaminated or damaged by too high contents of water.

During this thermochemical treatment of the oil reservoir the produced gases dissolve in the petroleum and thus further reduce the viscosity of the petroleum.

It should be generally noted that the substances used for the TGEC start to decompose and to evolve heat and gases if they are heated above about 200-300° C. Hence, if it is mentioned in the present application that TGEC and RIS are supplied to heat up a certain region, this also comprises the supply of only TGEC if this region already has a temperature at which the supplied TGEC will decompose to emit energy.

In this method an apparatus according to the invention as shown in FIG. 2 and FIG. 5 can be used in combination with such chemicals as ammonium nitrate, potassium nitrate, sodium nitrate and/or calcium nitrate, urea nitric acid adduct and the RIS compounds number 1 to 4 as designated in the table presented previously.

Fifth Embodiment of a Method

A fifth method of thermally treating an oil reservoir by using the TGEC and RIS mentioned above is characterized in that an apparatus can be used comprising only one tubing inserted into the oil well. Such apparatus is exemplarily depicted in FIG. 6 and described above as a sixth embodiment of an apparatus for performing thermochemical treatment of an oil reservoir.

With such method and apparatus a separate but continuous supply of TGEC and RIS is achieved by pumping the fluids in the form of fluid layers through the tubing. To avoid mixing and reaction of the TGEC and RIS layers before reaching the pay zone a layer of a spacer fluid is arranged between the layers of TGEC and RIS. As a spacer fluid any fluid can be used being inert regarding reactions with the TGEC and RIS. Such spacer fluid may be chloroform, for instance. The thickness of the spacer fluid layer is about 20-30 m.

After supplying granules of aluminum or aluminum/magnesium alloy as a suspension to the beaker where the granular material is accumulated a layer of spacer fluid and a layer of TGEC (acidic or alkaline solution) is pumped into the tubing. A contact time between the TGEC and the granular RIS material of about 200 s is sufficient to start and maintain reactions producing heat and gases to heat up the surrounding productive layer and to produce fractures therein. Like in the method described before, the beaker when made from aluminum will be destroyed after a calculated time and the reaction zone is shifted into the productive layer so that the thermal energy can be further distributed in the productive layer.

In this method the reaction chamber is formed by the tubing filled with the granular material which may form a layer of up to 50-200 m. Because of this, this method is suitable only for oil wells where the packer is located at least 200-300 m above the productive layer to be treated.

It should be generally noted that in the above described methods where granules of aluminum or aluminum/magnesium alloy are distributed in the fractures of the productive layer the fractures can be increased with respect to their length and volume and the productive layer can be further heated by supplying a strong oxidizing agent like potassium dichromate $K_2Cr_2O_7$ to the aluminum granules deposited in the productive layer. These strong oxidizing agents support the production of large amounts of energy and of solid metal oxides like $Al_2O_3$ which function as proppants (propping agents) to hold the fractures open.

With these methods a hot layer fracturing method is provided. In contrast to the known cold hydrofracturing method where in a first step a liquid (frac fluid) is injected into the oil well under pressure to create fractures in the formation and in a second step hard granular material such as sand (proppant) is pumped into the formed fractures the present hot layer fracturing method comprises three steps. In a first step the pressure for forming new fractures is not produced by the pumps pumping the material into the oil well but by the reactions in the oil well producing hot gases. In a second step the granules of aluminum or aluminum/magnesium alloy are pumped into the fractures. Then, in a third step, TGEC is injected into the oil well and into the fractures containing the RIS granules so that hot gases are produced in the fractures. This results in heating up the surrounding area and in forming of further fractures. In this third step a strong oxidizing agent like potassium dichromate $K_2Cr_2O_7$ can be additionally provided to the RIS granules deposited in the fractures as already mentioned above.

With the apparatus and methods described above it becomes possible to continuously produce thermal energy and hot gases which heats up the productive layer and thus allows an efficient extraction of even heavy oil and bitumen.

EXAMPLES

Comparative Example

For this comparative example the oil well #24193 at the "Irkenneft" oil field (Russia, Tatarstan) was selected. 1.2 t of ammonium nitrate in an aqueous solution with a concentration of about 50% by mass was injected into the oil well, wherein its decomposition was initiated by mixing it with an aqueous solution of 0.3 of sodium nitrite ($NaNO_2$). The temperature in the bore opposite the productive layer before the treatment was 66° C. The temperature in the bore (oil well #24193) opposite the productive layer after one hour of treatment was 126° C. The speed of petroleum extraction from the oil well #24193 before the treatment was 0.78 tons per day and after the treatment 1.86 tons per day.

Example According to the Invention

An aqueous solution of 1.3 t of mono ethanol amine nitrate was injected into the oil well #21 at the Razumovsky oil field in the Saratov region. The injected solution had a concentration of about 76% by mass of mono ethanol amine nitrate and 2% by mass of nitric acid. Its decomposition was initiated with the presence of 0.012 t of sodium borohydride ($NaBH_4$). The temperature in the bore opposite the productive layer before the treatment was 86° C. The temperature in the bore (oil well #21) opposite the productive layer after two hours of treatment was 269° C. The speed of petroleum extraction from oil well #21 before the treatment was 2.6 tons per day and after the treatment 12.3 tons per day.

The above comparative example and example according to the invention clearly show that with the present invention a higher increase of petroleum extraction can be achieved (about 373% for the example according to the invention) as compared with the methods used so far (about 138% for the comparative example).

Finally, it should be noted that the present invention is not restricted to the preferred embodiments described above and that alternative embodiments within the ordinary skill of a person skilled in the art are comprised.

What is claimed is:

1. A method of thermally treating an oil reservoir by initiating a chemical reaction in a pay zone of said oil reservoir, using a chemical system comprising at least the following two compositions:

a thermal gas emitting composition (TGEC) being an aqueous solution or suspension comprising at least one compound selected from the group consisting of hydrazine nitrate, 1,1-di $C_{2-6}$ alkyl hydrazine nitrates and 1,2-di $C_{2-6}$ alkyl hydrazine nitrates, guanidine nitrate, formamide nitric acid adduct, acetamide nitric acid adduct, acetonitrile nitric acid adduct, urea nitric acid adduct, ammonium nitrate, potassium nitrate, sodium nitrate, calcium nitrate, mono, di and tri $C_{1-5}$ alkyl amine nitrates, mono, di and tri $C_{1-5}$ alkanol amine nitrates, $C_{1-6}$ alkylene diamine mono and dinitrates and poly $C_{1-5}$ alkylene polyamine polynitrates; and a reaction initiator stabilizer (RIS) being a liquid solution or suspension and comprising at least one compound selected from the group consisting of:

metal borohydrides $MBH_4$, wherein M is Li, Na or K;

aminoboranes $(R^1R^2R^3)N.BH3$, wherein $R^1$, $R^2$ and $R^3$ are independently hydrogen or $C_{1-10}$ alkyl, or wherein $R^1$ is an aryl or pyridine with up to 10 carbon atoms and $R^2$ and $R^3$ are hydrogen;

dialkylaluminates $MAlH_2R^1R^2$, wherein M is Li, Na or K, and $R^1$ and $R^2$ are independently $C_{1-10}$ alkyl;

aminoalanes $(R^1R^2R^3)N.AlH_3$, wherein $R^1$, $R^2$ and $R^3$ are independently hydrogen or $C_{1-10}$ alkyl; and aluminum or aluminum alloys with magnesium, wherein said thermal gas emitting composition (TGEC) and said reaction initiator stabilizer (RIS) are separately introduced into said oil reservoir and are contacted in the pay zone of said oil reservoir to initiate a chemical reaction producing heat and gases, and wherein the TGEC is continuously introduced into the oil reservoir and the RIS is introduced simultaneously and in a continuous or intermittent way into the oil reservoir and wherein said method comprises the steps of:

(a) introducing granules of aluminum or an aluminum/magnesium alloy as the RIS into an oil well of said oil reservoir and keeping said granules in a first reaction chamber located in the oil well;

(b) introducing a first TGEC into the oil well so that it contacts said granules kept in said first reaction chamber for initiating and maintaining a thermochemical reaction producing thermal energy and heating up the walls of said first reaction chamber;

(c) introducing a second TGEC into the oil well such that it comes in contact with the heated walls of said first reaction chamber and is ignited;

(d) passing the ignited TGEC to a second reaction chamber where the TGEC reacts under production of heat and gases;

(e) passing produced hot gases into the pay zone of the oil reservoir (f) shifting the thermochemical reaction into the pay zone of the oil reservoir by allowing said granules to enter into the pay zone; and (g) contacting the granules in the pay zone with the second TGEC introduced into the oil well and wherein the granules in the pay zone are additionally contacted with at least one oxidizing agent.

2. The method of claim 1, wherein the introduction of the TGEC and the RIS is continued during the chemical reaction to maintain a continuous reaction.

3. The method of claim 1, wherein the TGEC is a reaction product of reacting nitric acid with a respective amino compound.

4. The method of claim 1, wherein the pH of the TGEC is about 3 to 14.

5. The method of claim 1, wherein the RIS is a solution or suspension in a solvent.

6. The method of claim 5, wherein the solvent is water or an organic solvent selected from the group consisting of petrol, ligroin, white spirit, kerosene and naphtha.

7. The method of claim 1, wherein the aluminum or aluminum alloys with magnesium are dispersed, pyrophoric or granular.

8. The method of claim 1, wherein the TGEC or the RIS additionally contain at least one soluble salt selected from the group consisting of Mn, Fe, Cr, Co, Ni or V.

9. The method of claim 1, wherein the TGEC and RIS are pumped into the oil reservoir at a rate of about 4-8 liters per second.

10. The method of claim 1, wherein said reaction chamber is located in or adjacent to the pay zone of the oil reservoir.

11. The method of claim 1, wherein urea nitric acid adduct is used as the TGEC.

12. The method of claim 1, wherein the pH value in the reaction chamber is about 3-4 and wherein hydrogen gas produced by the thermochemical reaction is oxidized by $H_2O$.

13. The method of claim 1, wherein the thermochemical reaction and thus the granules are shifted into fractures present in the pay zone.

14. The method of claim 1, wherein the thermochemical reaction is shifted into the pay zone after the pay zone is heated to about 300° C.

15. The method of claim 1, wherein petroleum in the oil reservoir is subjected to a hydrocracking process.

16. The method of claim 1, wherein the TGEC and RIS are introduced in the form of fluid layers separated by layers of a spacer fluid.

17. The method according to claim 1, wherein the 1,1-di $C_{2-6}$ alkyl hydrazine nitrate is 1,1-dimethyl hydrazine nitrate, the 1,2-di $C_{2-6}$ alkyl hydrazine nitrate is 1,2-dimethyl hydrazine nitrate, or both.

18. The method according to claim 1, wherein the oxidizing agent is potassium dichromate $K_2Cr_2O_7$.

* * * * *